United States Patent [19]

Meyer et al.

[11] Patent Number: 4,486,003
[45] Date of Patent: Dec. 4, 1984

[54] GATE VALVE STRUCTURE

[75] Inventors: Danny S. Meyer, Richmond; George A. Moran, Houston, both of Tex.

[73] Assignee: Joy Manufacturing Company, Pittsburgh, Pa.

[21] Appl. No.: 568,866

[22] Filed: Jan. 6, 1984

Related U.S. Application Data

[63] Continuation-in-part of Ser. No. 404,202, Aug. 2, 1982.

[51] Int. Cl.³ .............................................. F16K 3/00
[52] U.S. Cl. .................................... 251/328; 251/167; 251/172; 251/196
[58] Field of Search ................ 251/159, 167, 172, 196, 251/328

[56] References Cited

U.S. PATENT DOCUMENTS

| | | | |
|---|---|---|---|
| 3,006,601 | 10/1961 | Anderson | 251/196 |
| 3,929,316 | 12/1975 | Guthrie | 251/328 X |
| 4,236,691 | 12/1980 | Wright | 251/172 X |
| 4,320,890 | 3/1982 | Meyer | 251/167 X |

Primary Examiner—Harold W. Weakley
Attorney, Agent, or Firm—Marvin J. Marnock

[57] ABSTRACT

An expanding gate valve with a valve seat structure which comprises a pair of "floating" seat rings (60) loosely received in annular seat pockets (52) surrounding the flow passage through the valve and each having an axial dimension which exceeds the depth of the seat pocket. The front face (61) of each seat ring is disposed adjacent the gate assembly (24, 26) and is provided with an annular groove (63) and an annular resilient sealing element (64) therein adapted to form a ring of sealing contact area about the flow passage (14) when the gate assembly is expanded thereagainst. The rear face (66) of the seat ring (60) is provided with an annular groove (63') and a second annular resilient sealing element (64'). The two annular sealing elements are coaxial and the inner diameter of the front sealing element (64) exceeds that of the rear sealing element (64') so that the front sealing element is a greater radial distance from the flow passage (14) than is the rear sealing element. When the gate assembly is expanded against the seat rings (60), the annular area of the front of the seat ring exposed to flowline pressure exceeds the annular area of the rear of the seat ring exposed to flowline pressure whereby the seat ring is pressure energized towards the bottom (54) of the seat pocket (52). The annular sealing elements (64, 64') and bottoms of the annular grooves (63, 63') are provided with cooperating frusto-conical wedging surfaces (80, 94 and 80', 94') which for the upstream seat ring wedge the front face sealing element (64) towards the gate assembly and the rear sealing element (67) towards the bottom (54) of the seat pocket when there is pressure in the flow passage. To provide for a pressure energized downstream seal in the event of an upstream leak, additional frusto-conical surfaces on the sealing elements are provided to cooperate with additional frusto-conical surfaces in the groove bottom whereby fluid pressure from the valve chamber energizes the sealing elements to provide a downstream seal. A groove in the rear face of each sealing element between its frusto-conical surfaces adds sealing capability.

5 Claims, 5 Drawing Figures

GATE VALVE STRUCTURE

This is a continuation-in-part of pending patent application Ser. No. 404,202, filed Aug. 2, 1982.

BACKGROUND OF THE INVENTION

This invention relates generally to gate valves and more particularly to an improved valve seat structure for expanding gate valves.

Gate valves of the expanding gate type typically employ a gate mechanism which is mounted in a valve chamber and is movable therein transversely of the flow passage to open and close the valve. The gate assembly typically comprises a gate member and an adjacent segment member which, as the gate assembly approaches the open and closed positions, are expanded transversely of one another by cooperating cam surfaces whereby they are forced against seat rings in the valve body on opposite sides of the gate assembly for effecting upstream and downstream seals. The gate assembly includes parallel sealing surfaces which are maintained parallel as the gate assembly expands in the open and closed positions to seal against the seats. Upon movement from the open and closed positions, the gate assembly collapses from its expanded condition to permit reciprocal movement of the gate assembly without excessive friction between the gate assembly and the seat assemblies.

Most generally, the seat assemblies for expanding gate valves are retained within seat recesses which are formed within the valve body in surrounding relationship to the flow passage on each side of the gate assembly. The valve seats are in the form of seat rings which in one widely used valve structure are pressed into the seat recesses to that the seat will be retained in a fixed position. Ideally, the seats provide essentially planar and parallel surfaces for the gate assembly to contact and seal agains where it is in the expanded configuration regardless of whether the gate assembly is in the open position or the closed position. As a practical matter, however, the maintenance of parallelism between the outer sides of the gate assembly and the faces of the valve seats is frequently a problem which impairs the ability of the valve to achieve a seal. In addition, the seats do not always remain fixed and they may float or move inwardly toward the gate assembly under high differential pressure conditions. In doing so, the seats move to a position tight against the gate assembly and drag excessively thereon thus making the valve very difficult to open or close. An alternative construction to the fixed press-fit seat ring is the floating seat arrangement wherein the seat member is designed to float in the seat pocket in the direction of the flow passageway so that it can be moved against the gate sides by the fluid pressure. Such floating seats have the advantage of being able to seal against the gate and segment members even if there is a lack of parallelism or if there are irregularities in the mating surfaces of the gate assembly and the valve seat. A potential disadvantage of this type design is that excessive drag can be created between the seat members and the gate assembly when the gate assembly is moved due to the upstream seat being forced against the gate assembly by fluid pressure.

Furthermore, under high pressure service conditions in excess of 10,000 psi, there must be a smaller clearance between the seat ring and seat pocket to preclude damaging of the gate sealing surface by the misalignment of the metal seat ring. Accordingly, a reduced ability of such a floating seat to compensate for non-parallelism is associated with the smaller clearances. In addition, the operating torques for expanding the gate assembly to achieve a seal under high pressure service conditions become extremely high so as to make valve operation very difficult.

It is therefore an object of the invention to provide a gate valve of the expanding gate type with a unique improved "floating" valve seat construction wherein the seat element tends to be retained by differential flowline pressure in the open and closed conditions of the valve and as the gate assembly begins its movement to its collapsed condition intermediate its open and closed positions and is able to compensate for non-parallelism between the cooperating sealing surfaces of the valve seat and gate assembly, particularly in high pressure service conditions.

Another object is to provide a gate valve with an expansible gate assembly and valve seat means comprising a "floating" seat ring adapted to be urged by flowline pressure towards the back of the seat pocket to eliminate "drag" between the gate assembly and the valve seat as the gate assembly moves between open and closed positions.

A further object is to provide an expanding gate valve with "floating " seat rings, each with annular grooves with sealing elements in the front and rear faces and each sealing element having pairs of spaced frusto-conical surfaces adjacent its rear face for cooperating with conforming wedge surfaces in said grooves whereby the sealing elements in the upstream seat are cammed away from the flow passage to effect a seal and those in the downstream seat are cammed towards the flow passage to effect a seal in the event of leakage of the upstream seal.

SUMMARY OF THE INVENTION

The invention is an expanding gate valve which comprises a pair of "floating" seat rings loosely received in annular seat pockets surrounding the flow passage and each having an axial dimension which exceeds the depth of the seat pocket. The front face of each seat ring is adjacent the gate assembly and is provided with an annular groove and resilient sealing element therein adapted to form a ring of sealing contact area about the flow passage when the gate assembly is expanded thereagainst. The rear face of the seat ring is provided with an annular groove and a second annular sealing element. The inner diameter of the front sealing element exceeds that of the rear element so that the front element is a greater radial distance from the flow passage than is the rear element. When the gate assembly is expanded against the seat rings, the annular area of the front of the seat ring exposed to flowline pressure exceeds the area of the rear of the seat ring exposed to flowline pressure whereby the seat ring is pressure energized towards the bottom of the seat pocket. The annular sealing elements and bottoms of the annular grooves are provided with cooperating frusto-conical wedging surfaces which for the upstream seat ring wedge the front sealing element towards the gate assembly and the rear sealing element towards the bottom of the seat pocket when there is pressure in the flow passage. To provide for a pressure energized downstream seal in the event of an upstream leak, additional frusto-conical surfaces on the sealing elements are provided to cooperate with additional frusto-conical surfaces in the groove bottom whereby fluid pressure in the valve chamber energizes the sealing elements of the downstream seat ring to effect a downstream seal.

Figure 1:
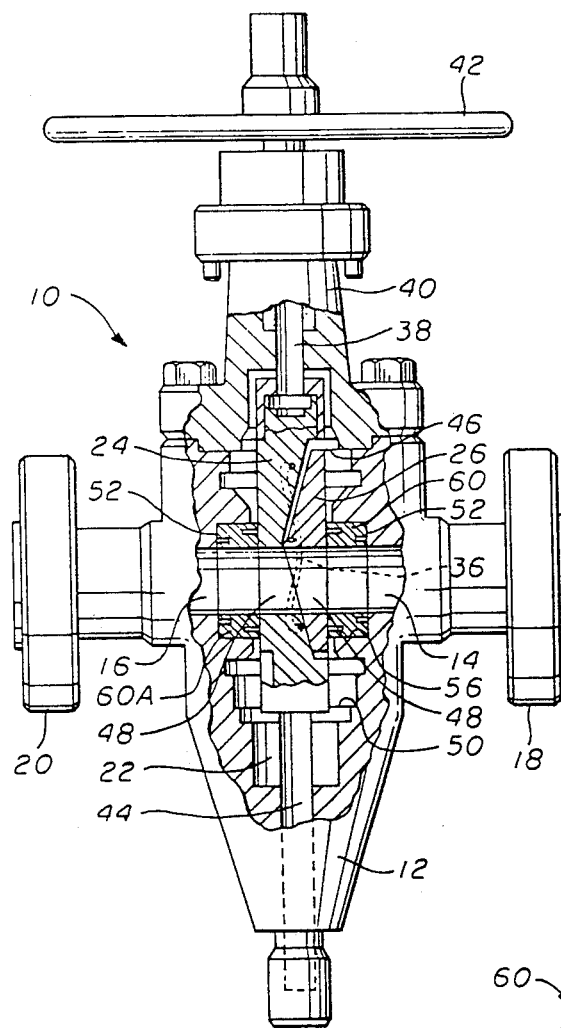
FIG. 1 is a side elevational view of an expanding gate valve equipped with floating seats in accordance with a preferred embodiment of the invention, with portions broken away for purposes of illustration.

Referring more particularly to the drawings, there is shown in FIG. 1 an expanding gate valve 10 which is provided with floating seats in accordance with the invention. The gate valve 10 includes a valve body 12 having an inlet passage 14 and an outlet passage 16. Flanges 18 and 20 are formed on body 12 at the outer ends of passages 14 and 16, respectively, to permit easy attachment of the valve body within a flowline. A valve chamber 22 is formed in body 12 between the flow passages 14 and 16 and in communication therewith to thereby provide a fluid flow passage through the body.

An expanding type gate assembly is mounted in valve chamber 22 for reciprocal movement therein between an open position and a closed position with respect to flow passages 14 and 16. The gate assembly includes a gate 24 located adjacent the downstream flow passage 16 and a segment 26 located adjacent the upstream flow passage 14. On the side facing segment 26, gate 24 has oppositely inclined surfaces 28 and 30 on its respective upper and lower portions. Segment 26 has similarly inclined surfaces 32 and 34 on its respective upper and lower portions for cooperative contact with surfaces 28 and 30 of gate 24 to expand and collapse the gate assembly, as will be explained in more detail. The outwardly facing sides of the gate and segment are planar surfaces which continually remain parallel to one another and perpendicular to the flow passage. A pair of curved springs 36 (FIG. 1) engage pins on opposite sides of gate 24 and segment 26 in a manner to continuously urge gate 24 and segment 26 toward one another to bias the gate assembly toward its collapsed condition. Gate 24 is connected with stem 38 which extends upwardly through a valve bonnet 40 mounted on top of valve body 12. A handwheel 42 is mounted on top of stem 38 to effect up and down movement of gate 24 in a conventional manner. A lower stem 44 extends downwardly from the bottom of gate 23 to pressure balance the gate assembly.

Figure 4:
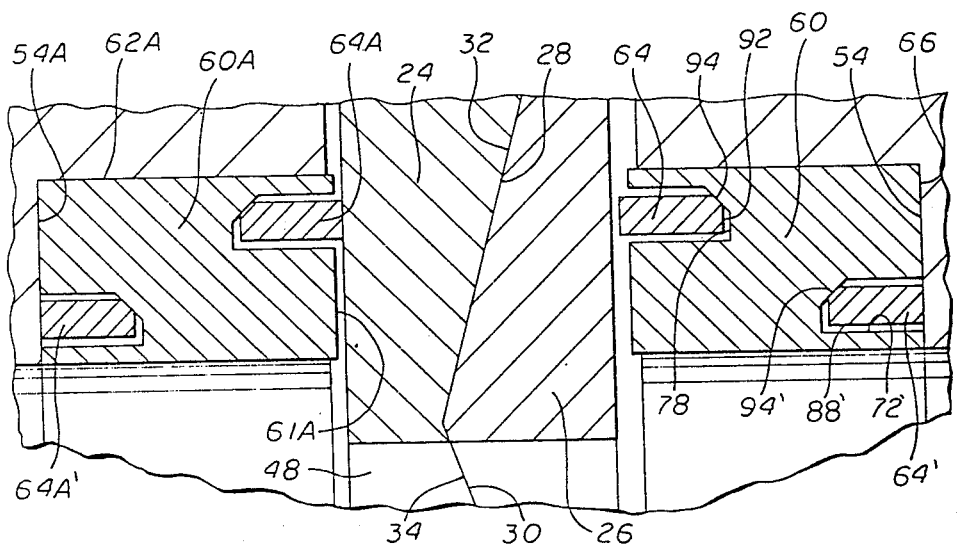
FIG. 4 is an enlarged fragmentary section view similar to FIG. 3 showing the gate assembly in movement from the closed position towards the fully open position and having just attained its collapsed condition.

When the gate assembly is moved upwardly in response to turning of handwheel 42, the top end of segment 26 contacts a stop 46 in the valve body to prevent further upward movement of the segment. Continued upward movement of gate 24 results in a lateral expansion of the gate assembly due to the camming action resulting from sliding contact between surfaces 30 and 34. When the gate assembly is in its upper fully open position as shown in FIG. 1, it is fully expanded and ports 48 formed through the gate and segment members are in alignment with each other and with the flow passages 14 and 16. Movement of gate 24 downwardly from the fully open position causes surfaces 30 and 34 to slide against one another, with assistance from spring 36, until the gate and segment are in the collapsed or minimum width condition as shown in FIG. 4. The springs 36 are attached to opposite sides of the gate assembly and flexed about lugs provided on the gate and segment members in a conventional manner to hold the gate assembly in its collapsed condition as it moves downwardly from the open position toward the closed position. As the gate assembly moves downwardly, the bottom of segment 26 contact a lower stop 50, thereby preventing further downward movement of the segment. Continued downward movement of gate 24 causes surfaces 28 and 32 to slide against one another in camming fashion such that the gate assembly is fully expanded when it reaches a lower fully closed position wherein passages 14 and 16 are blocked. When the gate assembly is moved upwardly from the closed position toward the open position, springs 36 urge the gate assembly to its collapsed condition in which it is maintained until the open position is reached, at which time the gate assembly expands. In the manner described above, the gate assembly is actuated to a fully expanded condition in both the open and closed positions of the valve and maintained in a fully collapsed condition when it is in transit between the open and closed positions.

In accordance with the present invention, valve body 12 is provided with a pair of annular recesses 52 which are formed around flow passages 14 and 16 at locations adjacent valve chamber 22 upstream and downstream thereof. The recesses 52 are of identical configuration although their orientations are opposite and each recess opens to valve chamber 22. The annular recesses 52 form seat pockets in each of which the valve seat assembly of this invention is inserted. Each seat pocket 52 has a planar annular bottom surface 54 which is oriented perpendicular to the flow passage of the valve and a cylindrical side wall 56 which is formed substantially coaxial with the flow passage through the valve.

Figure 2:
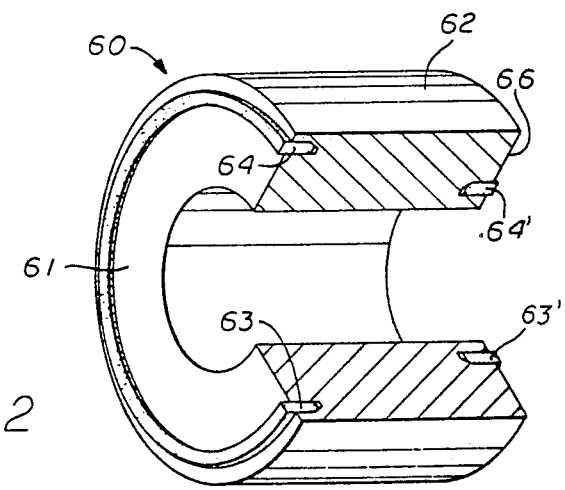
FIG. 2 is an enlarged perspective of a seat ring of the invention with a portion removed to show details of sealing elements in the ring.

The valve seat of this invention is shown in an enlarged perspective view thereof in FIG. 2. The valve seat comprises a metallic seat ring 60, the central bore of which corresponds in diameter and configuration to that of the flow passage through the valve. The axial dimension of the ring 60 is slightly larger than the depth of a seat pocket 52, so that when the seat ring is fully seated in the pocket 52, the ring 60 protrudes into the valve chamber 22 and its front face 61 is disposed to engage a planar side wall of the gate assembly when the gate assembly is expanded thereagainst. Further, according to the invention, the external diameter of the seat ring 60 is slightly less than the diameter of the seat pocket so that a clearance exists between the external cylindrical wall 62 of the seat ring 60 and the cylindrical side wall 56 of the seat pocket. Accordingly, the seat ring 60 is designed to fit loosely in the seat pocket in a "floating" relationship therewith and can therefore orient, when necessary, to establish a face-to-face contact with the sealing surface of the gate assembly when the gate assembly is expanded thereagainst.

The front face 61 of the seat ring is formed with an annular groove 63 therein which is concentric with the bore of the ring 60 and in surrounding relation to the valve flow passage. The groove 63 accommodates an annular resilient sealing member 64 which is adapted to establish a seal with the face of the segment of the gate assembly when the gate assembly is in its expanded condition. Accordingly, the axial dimension of the annular seal 64 exceeds the depth of the groove 63 so the seal 64 protrudes beyond the face 61 of the seat ring 60. For low pressure and low temperature service conditions, the resilient seal 64 may be of "Teflon" or other similar deformable plastic material. However, for high pressure service, generally pressures in excess of 10,000 psi, or at high operating temperatures greater than 500° F. (260° C.), a metallic sealing member is required to provide the necessary structural strength. In such instances, an aluminum bronze alloy or a soft stainless steel, such as 316 stainless steel, would be suitable material.

Also, as best seen in FIG. 2, the back face 66 of the seat ring 60 is provided with an annular groove 63' which corresponds in dimensions and configuration to the annular groove 63. A resilient sealing member 64', which is identical in radial cross section to the sealing member 64 and of the same material composition, is installed therein. Both of the annular sealing members 64, 64' are disposed in a coaxial relationship with the bore of the seat ring 60 and the flow passage through the valve. However, the inner diameter of the annular sealing member 64 in the front face 61 of the seat ring exceeds the inner diameter of the annular sealing member 64' in the back face 66 and, therefore, the sealing member 64 is disposed a greater distance from the flow passage than the sealing member 64' for purposes to be hereinafter described.

It is also to be noted that the clearance between the seat ring and the circumferential wall of the seat pocket must necessarily be smaller than that which is permissible when using plastic annular sealing members since under high pressure conditions the edge of the seat ring tends to do damage to the surface of the gate element. In one embodiment of the invention, a typical diametrical tolerance between the seat ring and seat pocket is 0.013 inches. For purposes of illustration, the various clearances between the groove walls in the seat rings and the sealing elements have necessarily been exaggerated.

In the invention, the configuration of the annular grooves 63, 63' in the front and rear faces of the seat ring 60 is as shown in U.S. Pat. No. 4,320,890 to Meyer et al, the disclosure of which is incorporated herein by reference. The annular groove 63, for example, is provided with a bottom 76 which includes a flat bottom portion 78 that is generally perpendicular to and adjacent to the inner groove side 72 which is the side nearest the flow passage, and a frusto-conical bottom portion 80 that is formed adjacent the outer groove side 74. The frusto-conical bottom portion 80 comprises between approximately twenty-five percent (25%) and approximately seventy percent (70%) of the width of the annular groove 63 and between approximately twenty percent (20%) and approximately fifty percent (50%) of the depth of the groove along the outer groove side 74. Accordingly, the frusto-conical bottom portion is disposed from the flat bottom portion 78 at an angle which is within a range between approximately thirty degrees (30°) and approximately sixty (60°).

The annular sealing member 64 is loosely received in the annular groove 63 for relatively unrestrained movement therein. The annular face seal 64 includes front and rear seal faces 84 and 86 joined by inner and outer seal sides 88 and 90. The axial dimension of the face seal 64 is between approximately 1.4 and 1.6 times the thickness thereof. The rear seal face 86 includes a flat rear portion 92 that is generally perpendicular to and adjacent the inner seal side 88 and a frusto-conical rear portion 94 that is formed adjacent outer seal side 90. The frusto-conical rear portion 94 is disposed from the flat rear portion 92 at an angle in the range between approximately thirty degrees (30°) and approximately sixty degrees (60°) but in conformity with the cone angle of the frusto-conical bottom 80 of the groove 63.

In a specific embodiment of an expanding gate valve of a standard commercial size, the front seal face 84, when the gate is in collapsed condition, extends past the front seat face by a distance "E" in the range of between approximately 0.002 inches (0.0051 cm) and approximately 0.015 inches (0.0381 cm). With the face seal 64 sitting loosely in the annular groove 63 with its frusto-conical surface engaging the frusto-conical bottom surface of the groove, the clearance between the groove side 74 and seal side 90 is in the range of 0.001 inches to 0.015 inches. The clearance between the seal side 88 and groove side 72 is approximately 0.021 inches which is the same as the clearance between the rear seal face 92 and the groove bottom 78.

The seat ring illustrated in FIG. 2 is described with reference numerals applied to the seating assembly used on the upstream side of the gate assembly. The seat ring and seat assembly used on the downstream side is identical to that shown in FIG. 2 and is installed in a reverse orientation to the upstream seat assembly. For ease of description, elements of the downstream seat assembly which correspond to those in the upstream seat assembly are identified with the same reference numerals but with a subscript appended thereto.

Figure 3:
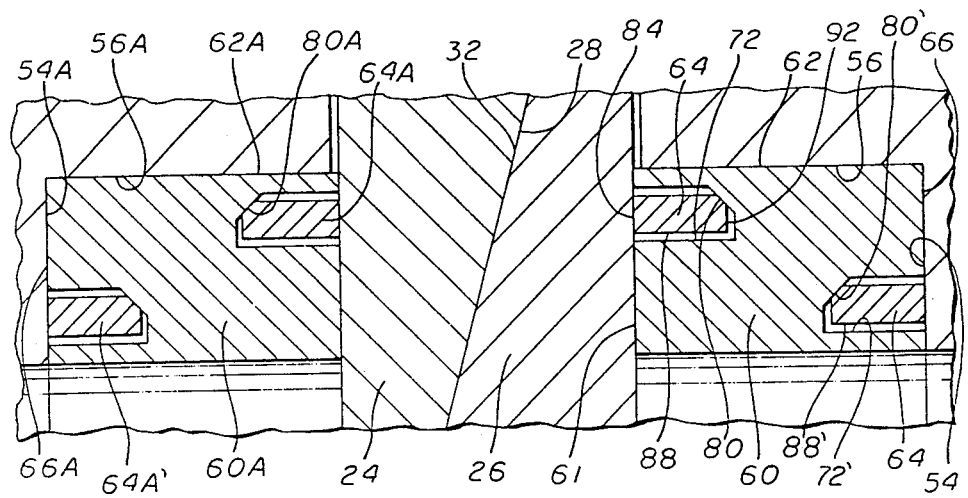
FIG. 3 is an enlarged fragmentary sectional view of the central portion of FIG. 1 with the portions of the upstream and downstream valve seat structures nearest the handwheel shown in an enlarged sectional view with the gate assembly expanded in the fully closed position and under fluid pressure from the flow passage.

When the gate assembly of the valve is moved to either the open or closed position by operation of the handwheel 42, the gate assembly is expanded against the seat ring elements on both the upstream and downstream sides of the gate assembly. As shown in FIG. 3 wherein the gate assembly is illustrated in the closed expanded condition, the sealing element 64 is compressed by the segment 26 and establishes a fluid-tight seal between the contacting faces of the seat ring 60 and the segment 26. The sealing element 64' also establishes a fluid-tight seal between the back face 66 of the seat ring 60 and the end wall 54 of the seat pocket.

It is to be noted that the inner edge of the sealing element 64 is located a distance from the flow passage 14 which exceeds the distance of the sealing element 64' from the flow passage 14. Accordingly, on the upstream side, pressurized fluid from the passage 14 will flow between the face 61 of the seat ring 60 and the sealing face of the segment 26 to where it is blocked by the sealing element 64. Similarly, pressurized fluid will flow between the back face 66 of the seat ring and the end wall 54 of the seat pocket to the inner edge of the sealing element 64'. Therefore, the annular area of surface of the front face 61 which is exposed to fluid pressure exceeds the annular area of surface of the back face 66 which is exposed to fluid pressure and the resultant differential force acts to urge the seat ring 60 more tightly against the back of the seat pocket to establish an even tighter seal at the back of the seat ring.

In addition, when there is initial movement of the gate assembly away from its fully open or fully closed position and the gate assembly begins to collapse, as shown in FIG. 4, this differential force resulting from the difference of exposed areas causes the seat ring 60 to be pressure actuated towards the end wall 54 of the seat pocket rather than towards the gate assembly. This prevents the seat ring from being forced out of the pocket and following towards the gate element to impose a drag thereon.

Although it is usually only the upstream valve seat that presents a problem with respect to dragging against the collapsed gate assembly, the downstream seat may in some cases pose a problem in this regard, particularly when reverse flow conditions are encountered. Accordingly, it is contemplated that both the upstream and downstream seats will normally be constructed in accordance with the invention.

While the relative locations of the annular sealing elements with respect to the flow passage results in pressure energizing of the seat ring 60 as to urge its retention in the seat pocket to serve the purposes of enhancing the sealing effectiveness of the valve seat assembly and also avoid any dragging contact of the seat ring with the gate assembly, the particular structure of the annular resilient sealing elements and the accommodating grooves in the front and rear faces of the seat ring enables the valve seats to compensate for out of parallel conditions which may exist between the cooperating sealing surfaces of the gate assembly and valve seat and between the seat ring and the valve body even though there is a very small clearance between the seat ring and the seat pocket. Furthermore, the cooperating wedging surfaces of the annular resilient sealing elements and the associated annular grooves in which they are received, act to establish more effective seals between the seat assembly and the valve body and gate assembly under pressure conditions and this effectiveness of the seals increases with increasing fluid pressure in the flow passage as described below.

As the gate assembly reaches its closed position, it expands against both upstream and downstream annular face seals 64 and 64A so that they are axially compressed to form a fluid-tight seal between themselves and the gate assembly and their respective annular grooves 63 and 63A. Also, the rear face seals 64' and 64A' in the upstream and downstream seat assemblies are likewise axially compressed to establish seals between the seat rings and the seat pocket bottoms 54 and 54A.

With respect to upstream annular face seal 64, fluid from inlet flow passage 14 then travels along the upstream side of segment 26 and into upstream annular groove 63, and is contained within a space between inner groove side 72 and inner seal side 88. The fluid does not leak past either the front or rear seal faces of annular face seal 64 due to the above described seal created between it and the gate assembly and upstream annular groove 63. As the fluid pressure builds within the space between the inner groove and seal sides, upstream annular face seal element 64 is forced to travel on its frusto-conical rear portion 94 up frusto-conical bottom portion 80. As upstream annular face seal 64 travels up frusto-conical bottom portion 80, it moves inwardly towards the gate assembly while the gate assembly simultaneously expands outwardly towards it. Fluid pressure built up in the space defined between flat bottom portion 78 of groove 63 and flat rear portion 92 of seal 64 also forces upstream annular face seal 64 to travel inwardly toward valve chamber 22 and the gate assembly. Thus, an effective seal which surrounds the flow passage is created between front seal face 84 and the gate assembly, and between frusto-conical rear portion 94 and annular groove 63. Because fluid from the flowline actually forces the upstream annular face seal to wedge towards the gate assembly, the effectiveness of the seal created by the annular face seal increases with increasing flow passage fluid pressure. The inward travel of the annular face seal towards the gate assembly reduces the distance the gate assembly must move against the direction of fluid flow in the flow passage. It can thus be seen that the ability of annular face seal 64 to move inwardly in response to fluid pressure in the flow passage facilitates the formation of an effective seal on the upstream side of the gate assembly without the need for exerting operating torques on the gate assembly of such degrees as has been required in the past.

As regards the annular sealing element 64' in the rear face of the seat ring 60, fluid from the flow passage enters between the rear face 66 of the seat ring and the bottom 54 of the seat pocket to be contained within the space between the inner groove side 72' and the inner seal side 88'. As the pressure builds within this space between the inner groove and seal sides, the sealing element 64' is forced to travel on its frusto-conical rear portion 94' up the frusto-conical groove bottom 80', thus causing it to move towards the bottom wall 54 of the seat pocket. The resulting compression of the sealing element 64' enhances the effectiveness of the seal between its frusto-conical surface 94' and that of the seat ring 60 as well as the seal between the sealing element 64' and the bottom wall 54 of the seat pocket.

With respect to the downstream annular face seal 64A when the gate assembly is placed in its closed expanded position, the downstream annular face seal 64A remains slightly axially compressed between frusto-conical bottom portion 80A of downstream annular groove 63A due to the expansion of the gate assembly. However, because fluid does not flow into downstream annular groove 63A, downstream annular face seal 64A, does not wedge inwardly towards the valve chamber 22.

FIG. 1 illustrates the gate assembly in its open position in which it is also fully expanded and the ports 48 through gate 24 and segment 26 are fully aligned. As the gate assembly reaches its open position, both the upstream and downstream annular face seals 64 and 64A are axially compressed to initially seal against the gate assembly and their respective annular grooves in a manner similar to that when the gate assembly reaches its closed position. However, because fluid from the flow passage has entered the valve chamber 22 during the movement of the gate assembly the fluid pressure on both sides of the upstream annular face seals 64 and 64' is equal, and the upstream annular face seals are not axially compressed any further by wedging against their frusto-conical groove bottoms 80 and 80'. The valve chamber pressure also precludes any further axial compression and wedging of the downstream seats 64A and 64A'.

With reference to FIG. 4, wherein the gate assembly is shown in transit from the closed position to the open position and has just assumed its fully collapsed condition, the frusto-conical rear portion 94 of the upstream face seal 64 moves away from the frusto-conical bottom portion 80 of the groove 63 and fluid contained between the inner sides and flat portions of the upstream annular groove 63 and the face seal 64 flows past these frustoconical surfaces 94, 80 to the outer sides of the annular groove 63 and face seal 64 thereby equalizing the fluid pressure on both sides of the upstream annular face seal 64. Once the fluid pressure on both sides of the upstream annular face seal 64 is equalized, the seal 64 moves into a wiping relationship with the gate assembly wherein the front seal face 84 is spaced apart a small distance from the gate assembly which reduces the amount of contaminants that can enter the valve chamber 22. In like manner, the downstream seal 64A assures a similar wiping relationship with the gate assembly by means of the sealing elements 64, 64A.

Figure 5:
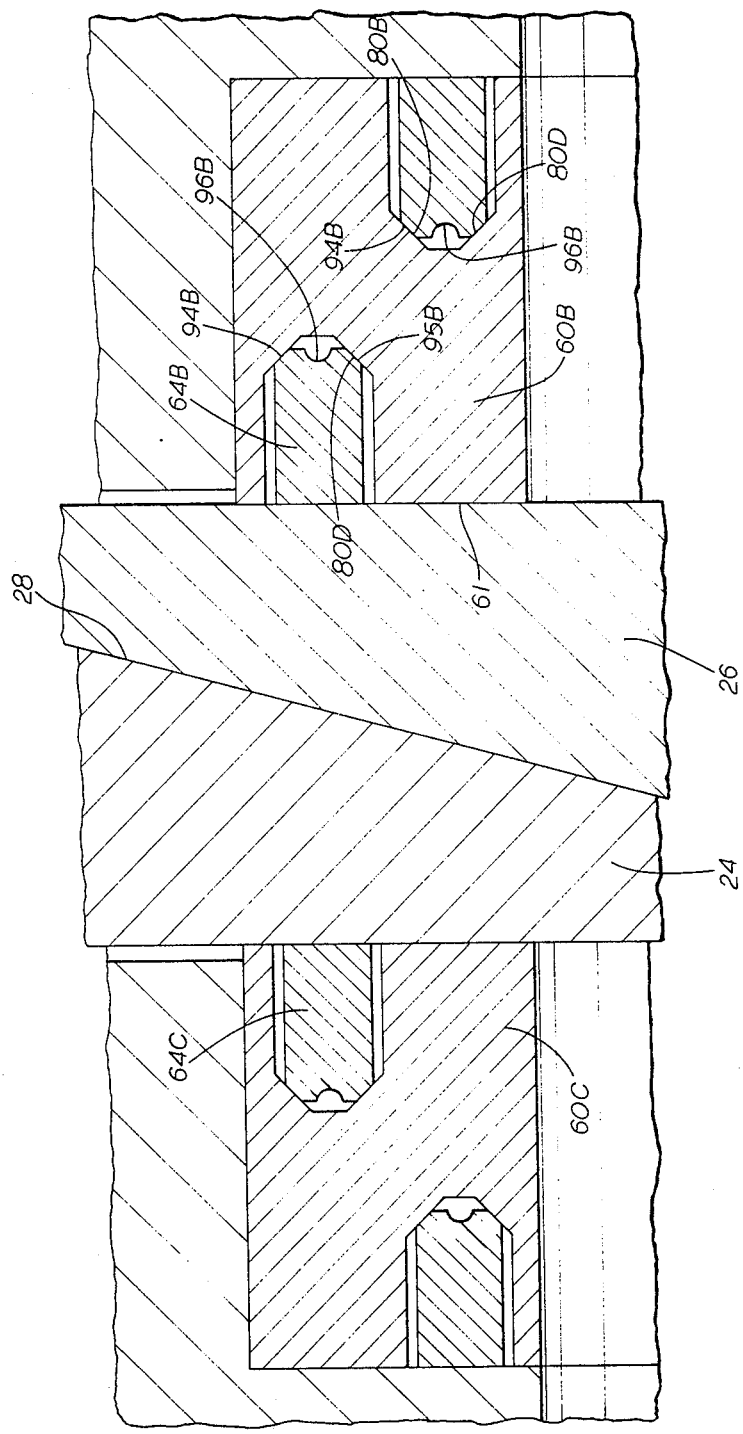
FIG. 5 is an enlarged perspective of a seat ring of the invention with a portion removed to show details of a modified form of sealing element carried in the ring.

In FIG. 5, there is shown a seat ring of the invention which incorporates a modified form of sealing element for use in its front and rear faces. This particular sealing element is provided with two frusto-conical surface portions 94B, 95B in its rear face. The flat rear portion of the sealing element includes an annular groove 96B located intermediate the two frustoconical surface portions and also disposed in coaxial relation to the ring axis. The annular grooves in the front and rear faces of the seat ring are similarly provided with a groove bottom having a pair of frusto-conical bottom portions 80B, 80D, each facing a different side of the groove. This particular embodiment of the invention presents the unique advantage that if there should occur a leakage past the upstream seals, then fluid pressure in the valve chamber will pressure energize the annular sealing members 64C in the downstream seat ring thereby effecting a downstream seal for the valve. This is accomplished by fluid pressure from the valve chamber entering the annular grooves in the faces of the downstream seat ring 60C and urging the frusto-conical surface 95B of each sealing member 64C which is nearest the flow way through the valve into a wedged fluid-tight sealing relation with that frusto-conical surface 80D of the groove bottom which is nearest the flow way. In addition, the annular groove in the rear face of the annular sealing member provides flexibility to the portions of the sealing member between the groove and the frusto-conical surfaces which significantly enhances the sealing capability of the valve. Further, the flexibility of the sealing portions of the annular sealing member allows it to be urged deeper into the seat pocket by flexure towards its central axis. Accordingly, there is less chance of "drag" by the annular sealing members when the gate assembly is moved to a collapsed condition. Such, of course, increases the lifetime of the sealing members.

The invention described herein is directed to floating seats for expanding gate valves which are pressure energized to minimize "drag" between the valve seats and the gate assembly and are also adapted to compensate for non- parallelism between the gate assembly sealing surfaces and the seat rings and between the seat rings and the bottoms of the seat pockets. At the same time, this unique seat and seal ring assembly allows the valve to effect a fluid-tight seal with the application of lesser operational torque than is generally required for conventional gate valves with floating seats and particularly so for operations under high pressure service conditions. Also, its sealing effectiveness increases with increasing pressure conditions.

While the invention has been illustrated with respect to a balanced stem gate valve, the invention could be used as well with an unbalanced gate valve. Furthermore, it is to be understood that the foregoing description of the invention has been presented for purposes of illustration and explanation and is not intended as limiting the invention to the precise form disclosed as changes in details of construction may be made by those skilled in the art, within the scope of the appended claims, without departing from the spirit of the invention.

What is claimed is:

1. A gate valve comprising a valve body having a valve chamber therein and inlet and outlet flow passages defining a flow way communicating with the valve chamber, an expanding gate assembly mounted within said chamber for sliding movement transversely of the flow way between a first position wherein the valve is open and a second position wherein the valve is closed and including wedgingly engageable elements arranged for sliding relative movement transversely of the flow way to expand the gate assembly in the longitudinal direction of the flow way when the valve is in said open and closed positions, said body having an internal annular recess surrounding each said flow passage and being defined by an end wall and a generally cylindrical side wall opening into said chamber;

a metallic seat ring disposed loosely within each said recess, each seat ring having an axial dimension which exceeds the depth of the recess in which it is disposed to thereby extend into said chamber, each said seat ring having a planar front face disposed towards the gate assembly and a first annular groove provided in its front face in surrounding relation to the flow way, each said seat ring having an annular rear face adapted to contact with the annular end wall of the recess and being provided with a second annular groove in its rear face in surrounding relation to said flow way, each said annular groove being defined by a pair of generally parallel and cylindrical groove sides comprising an inner groove side and an outer groove side and a groove bottom joining said inner and outer groove sides, each said groove bottom having a first frusto-conical bottom portion facing said inner groove side and joining said outer groove side, and a second frusto-conical bottom portion facing said outer groove side and joining said inner groove side;

a first annular sealing member loosely received within the annular groove in said front face of each of the seat rings and protruding into said chamber beyond the front face of the seat ring to form a ring of sealing contact area when the gate assembly is expanded thereagainst;

a second annular sealing member in each of said seat rings being loosely received within the annular groove in the rear face of the seat ring whereby it is adapted to form a fluid-tight barrier and seal between the rear face of the seat ring and the valve body when the gate assembly is in its expanded condition, each said annular sealing member in each of said seat rings having front and rear seal faces joined by generally parallel inner and outer cylindrical seal sides, said rear seal face having a first frusto-conical surface portion extending from said outer seal side in coaxial relation with said cylindrical seal sides and having a cone angle conforming to said first frusto-conical bottom portion, said rear seal face having a second frusto-conical surface portion extending from said outer seal side in coaxial relation with said cylindrical seal sides and having a cone angle conforming to said second frusto-conical bottom portion, and each said annular sealing member having a length dimension between its front and rear seal faces which exceeds the depth of said annular groove in which it is received such that said front seal face extends from said annular groove beyond the front seat face when loosely seated in the groove with its gate assembly in the collapsed condition whereby expansion of the gate assembly to the open or closed position effects an axial compression of the annular sealing member in each annular recess and fluid pressure in the flow way urges the annular sealing members in the upstream seat ring against said first frusto-conical bottom portions of the grooves in the upstream seat ring in a wedging movement toward the gate assembly to effect a tight seal therewith which increases with increasing fluid pressure and in the event of leakage past the upstream seat ring in the closed condition of the valve fluid pressure in the valve chamber urges the annular sealing members in the downstream seat ring against said second frusto-conical bottom portions of the grooves in the downstream seat ring in a wedging movement toward the gate assembly to effect a tight seal therewith which increases with increasing fluid pressure.

2. A gate valve structure as set forth in claim 1 wherein said first and second annular resilient sealing members of each said seat ring are metallic.

3. A gate valve structure as set forth in claim 1 wherein said said frusto-conical bottom portion has a cone angle in the range from thirty degrees to sixty degrees and is disposed coaxial with said inner and outer groove sides.

4. A gate valve structure as set forth in claim 1 wherein each said annular sealing member of each seat ring is provided on its rear face with an annular groove in coaxial relation to the seat ring and intermediate the first and second frusto-conical surface portions of the rear face of the annular sealing member.

5. A gate valve structure as set forth in claim 1 wherein said first annular sealing member of each seat ring has an inner diameter which exceeds the inner diameter of the second annular sealing member of the seat ring and is disposed with its inner edge a greater distance from the flow way than the distance of the inner edge of the second annular sealing member from the flow way whereby the area of the front face of the seat ring which is exposed to fluid pressure from the flow way is greater than the annular area of the rear face of the seat ring which is exposed to fluid pressure from the flow way to thereby act to retain said seat ring in said recess and to enhance the seal between the seat ring and the end wall of the recess in the expanded condition of the gate assembly.

* * * * *